United States Patent [19]

Hanatani et al.

[11] Patent Number: 5,151,324
[45] Date of Patent: Sep. 29, 1992

[54] PATTERN COLORING MATERIAL FOR SYNTHETIC RESINS, METHOD FOR PRODUCING SAME AND SYNTHETIC RESIN MOLDED PRODUCTS USING SAME

[75] Inventors: Tadashi Hanatani, Takatsuki; Satoru Sanzen, Osaka; Jichio Deguchi, Yokkaichi, all of Japan

[73] Assignees: Mitsubishi Petrochemical Co., Ltd., Tokyo; O.K.-Kasei Co., Ltd., Osaka, both of Japan

[21] Appl. No.: 594,595

[22] Filed: Oct. 9, 1990

[30] Foreign Application Priority Data

Oct. 9, 1989 [JP] Japan .................... 1-263425
Jul. 13, 1990 [JP] Japan .................... 2-184157

[51] Int. Cl.$^5$ ............................................. B32B 5/16
[52] U.S. Cl. .................................. 428/323; 428/323; 428/447; 428/402

[58] Field of Search ................ 428/402, 323, 329, 447

[56] References Cited

U.S. PATENT DOCUMENTS 4,073,992  2/1978  Lerman et al. .................... 428/207
4,904,732  2/1990  Iwahara .............................. 525/288

Primary Examiner—Edith L. Buffalow
Attorney, Agent, or Firm—Sughrue, Mion, Zinn, Macpeak & Seas

[57] ABSTRACT

Pattern coloring material for synthetic resins, comprising particulate matter of a cross-linked olefin polymer containing pigment, which is useful as a material for producing synthetic resin molded products with colored patterns. The material is produced by kneading crosslinkable olefin polymer with pigment, granulating the kneaded mixture and subjecting the particulate matter thereby obtained to a cross-linking treatment.

4 Claims, No Drawings

PATTERN COLORING MATERIAL FOR SYNTHETIC RESINS, METHOD FOR PRODUCING SAME AND SYNTHETIC RESIN MOLDED PRODUCTS USING SAME

BACKGROUND OF THE INVENTION

1. Field of the Invention

The present invention relates to a pattern coloring material for synthetic resins, a method for producing the same, and synthetic resin molded products using the same. More specifically, the present invention relates to a pattern coloring material useful for the production of thermoplastic synthetic resin molded products with a colored pattern.

2. Description of the Related Art

Conventionally known methods for producing colored synthetic resin molded products with a pattern in multiple colors are, for example, a method comprising mixing two types of resins with different melting viscosities from each other and molding the resulting mixture (Japanese Patent Laid-open No. 42214/1989); a method comprising mixing various inactive materials in a non-melted state with resins and molding the resulting mixture, the materials including inorganic fillers in the forms of fibers, flakes and particles, and polyester; and a color-mixed or multiplecolor molding method employing a specific mold or equipment ("Injection Mold" published by Plastic Age K.K.).

However, these methods are not always satisfactory. According to the method utilizing differences in melting viscosity, some restrictions are imposed on the practically possible pattern forms, so that flexible processing is hard; according to the method comprising adding insoluble materials such as inorganic fillers or polyesters, the physical qualities of products may be deteriorated, which is exemplified in the reduction of stretching and impact; the method using a specific mold and equipment lacks flexibility concerning production equipment, leading to increases in merchandise cost.

SUMMARY OF THE INVENTION

The present inventors, as a result of intensive investigation towards producing molded products with beautiful and vivid, undefined or mottled patterns, using a simpler technique than the conventional methods have achieved the present invention.

According to the present invention, there are provided a pattern coloring material for synthetic resins, the material comprising particulate matter of a cross-linked olefin polymer containing pigment; a method for producing the material, comprising kneading an olefin polymer and/or a crosslinkable olefin polymer with pigment, granulating the mixture into particulates and cross-linking the particulate matter; and synthetic resin molded products with a colored pattern, obtained by molding a blend containing the pattern coloring material and a thermoplastic synthetic resin.

DESCRIPTION OF THE PREFERRED EMBODIMENTS

I. Pattern Coloring Material for Synthetic Resins

The pattern coloring material of the present invention comprises particulate matter of a cross-linked olefin polymer containing pigment.

A. Cross-Linked Olefin Polymer

The cross-linked olefin polymer to be used in the present invention is one obtained by cross-linking an olefin polymer compounded with pigment according to normal methods. The cross-linked olefin polymer may be produced, for example, by the method for chemically cross-linking an olefin polymer containing pigment using peroxide, the method for cross-linking the polymer by electron beam irradiation or the method for cross-linking a crosslinkable olefin polymer possessing unsaturated bonds or an alkoxysilane group with heat or water utilizing catalytic action. Among them, the method using a crosslinkable olefin polymer is particularly preferable, because no substantial restrictions are imposed thereby on the olefin polymer to be used and no specific or costly equipment for the cross-linking is thereby required.

The crosslinkable olefin polymer is an olefin polymer containing a vinyl group or alkoxysilane group within its molecule, and through the vinyl group or alkoxysilane group thereof, the olefin polymer molecules are cross-linked with each other. A preferable example of the crosslinkable olefin polymer is illustrated in an olefin polymer modified with a vinylsilane compound. Specific examples thereof include a graft copolymer of vinylsilane compound such as vinyltrimethoxysilane and γ-methacroyloxypropyltrimethoxysilane with an olefin polymer, or a random copolymer of a vinylsilane compound with ethylene. Such a vinylsilane-modified olefin polymer is described in detail in for example Japanese Patent Publication No. 1711/1973, Japanese Patent Laid-open No. 36115/1984, and Japanese Patent Laid-open No. 9611/1980, and they are able to be obtained on the market.

The vinylsilane-modified olefin polymer is easily subjected to a cross-linking reaction in water, with a silanol condensation catalyst such as dibutyltin dilaurate. For the above reason, the present method is extremely advantageous, compared with either the chemical cross-linking method or the irradiation cross-linking method.

The cross-linked olefin polymer to be used in the present invention has a degree of as defined in JIS (Japanese Industrial Standard) C3005 which is preferably 2 wt % or more, more preferably 4 wt % or more and most preferably 4 to 90 wt %.

The olefin polymer to be used in the present invention includes polypropylene, polyethylene or copolymers of ethylene with a small ratio (generally 0.1 to 15 wt %, preferably 0.5 to 6 wt %) of propylene and/or butene. Specifically, the polymer includes polyethylene resin which has a density of 0.862 to 0.965 g/cm$^3$ and a melt index of 0.1 to 60 g/10 min, preferably 0.2 to 25/10 min, such as ultra-low-density polyethylene, low-density polyethylene, linear low-density polyethylene, medium-density polyethylene, high-density polyethylene; ethylenevinyl acetate copolymer with a content of vinyl acetate from 0.1 to 25 wt %, ethylene-acrylic acid copolymer with an acrylic acid content of 0.1 to 25 wt %, propylene polymer resin such as polypropylene, propylene-ethylene copolymer with an ethylene content of 0.5 to 10 wt %, propylene-butene-1 copolymer and propylene-hexene-1 copolymer, polybutene, ethylene-propylene rubber and ethylene-propylene-diene rubber.

B. Pigment

The pigment to be used in the present invention may be selected from those which have been conventionally used in various resins, and there is no specific limitation on the type or combination thereof. For example, organic pigments such as insoluble azos, condensed azos, anthraquinones, isoindolenones, perylenes, perynones, dioxazines, phthalocyanines, quinacridones and heterocyclic compounds; and inorganic pigments such as carbon black, titanium oxide, blood red, black oxide of iron, Milori blue and ultramarine blue may be included.

Such pigment may preferably be used in an amount of 0.01 to 20 parts by weight, more preferably 0.01 to 5 parts by weight per 100 parts by weight of the olefin polymer.

C. Particulate matter

The term particulate matter refers to a particulate with a mean particle size of 1 to 10,000 μm, preferably 10 to 7,000 μm. Particulate matter in the form of pellets or beads has a value of L/D from about 0.5 to 3. The value of D is used as the mean particle size.

II. Production of Pattern Coloring Materials

The pattern coloring material of the present invention is produced by kneading such pigment described above with the aforementioned olefin polymer and/or crosslinkable olefin polymer, granulating the mixture into particulates and cross-linking the particulate matter.

A. Kneading and Granulation

Olefin polymer and pigment are kneaded using a Henschel mixer, a V blender, a tumbler, etc., and subjected to melting and kneading with a granulating machine to be made into particulates. In order to obtain an intimately kneaded product comprising olefin polymer and pigment, there may be then added to the product, if necessary, dispersants such as metal stearate, metal oleate, etc., and compatibilizing agents such as low-molecular weight polyethylene wax.

When using a crosslinkable olefin polymer such as a vinylsilane-modified olefin polymer, there may be added a catalyst necessary for the subsequent cross-linking reacion, for example, dibutyltin dilaurate.

It is preferable to use a crosslinkable olefin polymer compounded with an olefin polymer at a compounding ratio of 5–99: 95-1, preferably 10–95: 90-5, when represented in parts by weight of crosslinkable olefin polymer and olefin polymer, sequentially. Less than 5 parts by weight of crosslinkable olefin polymer is not preferable, because a state similar to a uniform dispersion may be caused when the resulting pattern coloring material is mixed with synthetic resin for molding, possibly due to the weakness of the bonding strength among molecular chains of olefin polymer through cross-linking. Consequently, a coloring pattern may not appear on the molded product.

When compounding a crosslinkable olefin polymer with an olefin polymer, it is preferable to select the two polymers from among an identical group, in terms of compatibility and physical properties of the two polymers. The use of the crosslinkable olefin polymer compounded with an olefin polymer has merit in that objective compositions with various degrees of cross-linking may be extremely easily obtained, for example, by compounding the olefin polymer into one kind of crosslinkable olefin polymer in a wide variety of fashions.

Particulate matter in the form of pellets or beads may be produced by commonly used methods, for example, strand cut techniques, hot cut techniques, underwater cut techniques and the like.

Particulate matter in the form of powder is generally produced by cross-linking pellets and powdering the cross-linked pellets. Particulate matter in the form of powder is useful, particularly for the production of film with a colored pattern.

B. Cross-Linking Treatment

Particulate matter essentially composed of an olefin polymer and/or a crosslinkable olefin polymer and pigment is subjected to a cross-linking process. As the cross-linking method, there may be employed those techniques generally used for cross-linking olefin polymer. As have been described above, representative techniques thereof are chemical cross-linking methods using peroxide, irradiation cross-linking methods with electron beams and the cross-linking method of crosslinkable olefin polymers by catalytic action.

III. Synthetic Resin Molded Products

According to the present invention, there are provided synthetic resin molded products having a colored pattern, by using the pattern coloring material described above.

That is, the synthetic resin molded products are those having a colored pattern produced by molding a blend containing the pattern coloring material and a synthetic resin.

A. Synthetic Resin

The synthetic resin to be used in the present invention is classified in the thermoplastic synthetic resins, specifically including olefin polymer resins, polystyrene resins, ABS resins, polyester resins, polyphenylene ether resins, polyvinyl chloride resins, etc. Olefin polymer resins are particularly preferable.

Specific examples of the olefin polymer resin include the olefin polymers illustrated in item I.A. In terms of ease of molding, vivid colored patterns and physical properties of the molded products, it is preferable to select an olefin polymer of the same type as the pattern coloring material.

B. Compounding and Molding

The compounding ratio of the pattern coloring material and the synthetic resin is 0.1 to 50 parts, preferably 0.5 to 30 parts by weight of the pattern coloring material per 100 parts by weight of the synthetic resin. If the compounded amount of the pattern coloring material is less than 0.1 parts by weight, the pattern coloring material will seem to be incorporated in the color of the synthetic resin of itself and the pattern won't develop clearly. If the compounded amount of the pattern coloring material is more than 50 parts by weight, the color of the pattern coloring material appears predominantly so that the developing pattern becomes unclear.

The pattern coloring material and the synthetic resin may be mixed by common blending means such as hand blenders, V blenders, tumblers, Henschel mixers and the like.

The pattern coloring material may be used singly, as well as in combination with several other pattern coloring materials capable of developing different colors.

When mixing, there may be added dispersants such as zinc stearate; lubricants; various stabilizers such as antioxidants, ultraviolet light preventing agents, antistatic agents, copper inhibitors and the like; fire retardant additives; fillers; foaming agents, etc.

The molding of a blend may be practiced by employing means and equipment commonly used for a thermoplastic resin, for example, in-line screw type injection molders, blow molders, film molders, extrusion molders, etc.

The present invention will now be explained in the following examples.

EXAMPLE 1

Five (5) parts by weight of a master batch consisting of 100 parts by weight of a propylene-ethylene block copolymer (registered trademark "Mitsubishi Polypro-BC3" manufactured by Mitsubishi Petrochemical Co., Ltd.) and one (1) part of dibutyltin dilaurate were compounded into 100 parts by weight of a polypropylene silane crosslinkable polymer (registered trademark "Linklon XPM 700B" manufactured by Mitsubishi Petrochemical Co., Ltd.; polypropylene-vinyltrimethoxysilane graft copolymer), to which was added as pigment a composition consisting of 1.8 parts by weight of titanium dioxide, 0.1 part by weight of magnesium stearate and 0.1 part by weight of zinc stearate. The resulting mixture was mixed and stirred with a Henschel mixer for two minutes and was then melted and kneaded in an extruding granulator (diameter; 40$\phi$, L/D; 32) at 210° C., to prepare white colored pellets. The pellets obtained were cross-linked by soaking in hot water at 90° C. for five hours, and were subsequently dehydrated and dried to obtain 107 parts by weight of a coloring material. The degree of cross linking thereof was 78 wt %.

A composition composed of 100 parts by weight of the propylene-ethylene block copolymer identical to that described above, 0.5 part by weight of carbon black (registered trademark "Mitsubishi Carbon Black #900" manufactured by Mitsubishi Kasei Corporation, 0.2 part by weight of magnesium stearate and 0.2 part by weight of zinc stearate was hand blended, to which was added five (5) parts by weight of the coloring material produced in the above manner. By using an inline screw type injection molder, the resulting mixture was molded at an injection temperature of 230° C., into a molded board 2 mm thick.

The molded product thus obtained had beauty of a high quality similar to the appearance of natural marble, on which a vivid black-marble-like pattern developed.

EXAMPLE 2

Four (4) parts by weight of a master batch consisting of 100 parts by weight of the propylene-ethylene block copolymer and one (1) part by weight of dibutyltin dilaurate were compounded into seventy (70) parts by weight of the polypropylene silane crosslinkable polymer and 30 parts by weight of the propylene-ethylene block copolymer used in Example 1, to which was then added as pigment a composition consisting of two (2) parts by weight of disazo yellow (registered trademark "PV-Fast Yellow HG" manufactured by Hoechst AG.), one (1) part by weight of magnesium stearate and one (1) part by weight of zinc stearate, to prepare 108 parts by weight of a coloring material [A] in yellow pellets, following the same method as in Example 1. The degree of cross-linking was 55 wt %.

Five (5) parts by weight of a master batch consisting of 100 parts by weight of the propylene-ethylene block copolymer described above and one (1) part by weight of dibutyltin dilaurate were compounded into 100 parts by weight of the polypropylene silane crosslinkable polymer identical to that used in Example 1, to which was then added as pigment a composition consisting of 1.2 parts by weight of "Cyanine Blue" (registered trademark; manufactured by Sumitomo Chemical Co. Ltd.), 0.6 part by weight of magnesium stearate and 0.6 part by weight of zinc stearate, to prepare 107.4 parts by weight of a coloring material [B] in blue pellets, following the same method as in Example 1. The degree of cross-linking was 76 wt %.

A composition composed of 100 parts by weight of the propylene-ethylene block copolymer identical to that described above, 0.5 part by weight of titanium dioxide (registered trade-mark "Tipaque R-680" manufactured by Ishihara Sangyo Kaisha, Ltd.), 0.1 part by weight of magnesium stearate and 0.1 part by weight of zinc stearate was hand blended, to which were added seven (7) parts by weight of the coloring material [A] and three (3) parts by weight of the coloring material [B], produced above, and then the resulting mixture was injection molded as in Example 1.

The molded product thus obtained had a beauty of high quality and was basically white, on which the colors of sky blue and yellow formed marbleized patterns, independently.

EXAMPLE 3

Three (3) parts by weight of a master batch consisting of 100 parts by weight of high-density polyethylene (registered trade-mark "Mitsubishi Polyethy-EX40" manufactured by Mitsubishi Petrochemical Co., Ltd.) and one (1) part of dibutyltin dilaurate were compounded into five (5) parts by weight of polyethylene silane crosslinkable polymer (registered trade-mark "Linklon HF 700N" manufactured by Mitsubishi Petrochemical Co., Ltd.; a polyethylene-vinyltrimethoxysilane graft copolymer) and 95 parts by weight of the high-density polyethylene described above, to which were added as pigment a composition consisting of one (1) part by weight of "Brilliant Gold" (registered trademark; manufactured by The Mearl Corporation), one (1) part by weight of "Copper" (registered trade-mark; manufactured by The Mearl Corporation) and 0.4 part by weight of zinc stearate, to prepare 105.4 parts by weight of a coloring material, following the same technique as in Example 1. The degree of cross-linking thereof was 5 wt %.

To 100 parts by weight of the high-density polyethylene used above was added five (5) parts by weight of the coloring material produced above, which was molded at 190° C., using a blow molders ("IPB-10B" manufactured by Ishikawajima-Harima Heavy Industries Co., Ltd.), into a hollow container 0.7 mm thick with a 250 cc capacity. The thus obtained molded product had a stream pattern in dark bronze color on its light bronze-like base, a metallic sparkling luster, and beauty of a high quality.

EXAMPLE 4

Three (3) parts by weight of a master batch consisting of 100 parts by weight of the high-density polyethylene as used above and one (1) part by weight of dioctyltin dilaurate were compounded into eight (8) parts by weight of a polyethylene silane crosslinkable polymer (registered trademark "Linklon XLE 830N" manufactured by Mitsubishi Petrochemical Co., Ltd.; a polyethylene-vinyltrimethoxysilane graft copolymer) and 92 parts by weight of a linear low-density polyethylene (registered trademark "Mitsubishi Polyethy-UF421" manufactured by Mitsubishi Petrochemical Co., Ltd.), to which was added as pigment a composition consisting of 0.45 part by weight of blood red (registered trademark "GF-2-#113" manufactured by Nippon Bengara K.K.), 0.25 part by weight of titanium yellow (registered trademark "#118S" manufactured by Nippon Fellow K.K.), 0.06 part by weight of carbon black (registered trademark "Mitsubishi Carbon Black #900" manufactured by Mitsubishi Kasei Corporation), 0.075 part by weight of magnesium stearate, and 0.075 part by weight of zinc stearate, to prepare 103.9 parts by weight of a coloring material following the same technique as in Example 1. The degree of cross-linking thereof was 8 wt %. Subsequently, the material was ground by using a mill into a powder of a mean particle size of 250 μm.

To 100 parts by weight of the linear low-density polyethylene described above was added as pigment a composition composed of 0.5 part by weight of titanium dioxide ("Tipaque R-680" manufactured by Ishihara Sangyo Kaisha, Ltd.), 0.011 part by weight of blood red (registered trademark "GF-2-#113" manufactured by Nippon Bengara K.K.), 0.14 part by weight of titanium yellow ("#118S" manufactured by Nippon Fellow K.K.), 0.009 part by weight of carbon black (registered trade mark "Mitsubishi Carbon Black #900" manufactured by Mitsubishi Kasei Corporation), 0.07 part by weight of magnesium stearate and 0.07 part by weight of zinc stearate, and then hand blended. Then, four (4) parts by weight of the coloring material in the form of powder, produced above, were added to the hand-blended mixture and molded using a film molder (inflation molding machine of 40φ diameter and L/D 24, manufactured by Modern Machinery Co. Ltd.) at a die temperature of 180° C., into a film 80μ thick.

The molded product thus obtained had beauty of a high quality close to the appearance of natural wood, on which vividly brown patterns of wood grain developed in the film drawing direction.

COMPARATIVE EXAMPLE 1

A pattern coloring material was produced following the same procedure as in Example 1, except that a propyleneethylene block copolymer ("Mitsubishi Polypro-BC3" was used instead of the polypropylene silane crosslinkable polymer used in Example 1. Then, a molded board was also molded as in Example 1.

The molded product thus obtained did not have a pattern, but was in a single color of slightly grayish black on the whole.

As is clearly shown in the Examples described above, the pattern coloring material of the present invention has extremely great effects on the production of synthetic resin molded products prossessing colored patterns; according to the present invention, molded products with beautiful, vivid and complex colored patterns may be readily obtained. According to the present invention, there may be obtained molded products with patterns and similarities to the appearance of natural products including marble, other natural stones, wood grain, tortoiseshell and the like.

Because a cross-linked polymer is used as the base of the pattern coloring material in the present invention, the material falls into a flexible state when heated during the molding process. However, the bonding among the molecular chains thereof may not be released and therefore, the material does not uniformly disperse, leading to the formation of pattern.

What is claimed is:

1. A pattern coloring material for synthetic resins, comprising particulate matter of a cross-linked olefin polymer containing pigment, said cross-linked olefin polymer being a product obtained by cross-linking a vinylsilane-modified ethylene polymer or a vinylsilane-modified propylene polymer, said particulate matter being in the form of a powder, pellets or beads having a mean particle size of 1 to 10,000 μm.

2. A pattern coloring material for synthetic resins according to claim 1, wherein the cross-linked olefin polymer has a degree of cross-linking (based on JIS C3005) of 2 wt % or more.

3. Synthetic resin molded products provided with a colored pattern, produced by molding a blend containing a pattern coloring material for synthetic resins and a synthetic resin, the pattern coloring material for synthetic resins comprising the particulate matter of cross-linked olefin polymer containing pigment said cross-linked olefin polymer being a product obtained by cross-linking a vinylsilane-modified ethylene polymer or a vinylsilane-modified propylene polymer, said particulate matter being in the form of a powder, pellets or beads having a mean particle size of 1 to 10,000 μm.

4. The molded products according to claim 3, wherein the blend contains 0.1 to 50 parts by weight of the pattern coloring material per 100 parts by weight of the synthetic resin.

* * * * *